(12) United States Patent
Johnson et al.

(10) Patent No.: US 6,961,296 B2
(45) Date of Patent: Nov. 1, 2005

(54) SPATIALLY-SPECTRALLY SWEPT OPTICAL MEMORIES AND ADDRESSING METHODS

(75) Inventors: Alan E. Johnson, Eugene, OR (US); Eric S. Maniloff, Eugene, OR (US); Thomas W. Mossberg, Eugene, OR (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 10/617,075

(22) Filed: Jul. 9, 2003

(65) Prior Publication Data

US 2004/0008565 A1 Jan. 15, 2004

Related U.S. Application Data

(62) Division of application No. 09/412,841, filed on Oct. 5, 1999, now Pat. No. 6,618,342.
(60) Provisional application No. 60/103,001, filed on Oct. 5, 1998.

(51) Int. Cl.$^7$ .................................................. G11B 7/00
(52) U.S. Cl. .................................. 369/100; 369/124.04
(58) Field of Search ........................... 369/47.19, 47.24, 369/47.35, 59.11, 59.12, 59.16, 59.17, 100, 112.01, 124.03, 124.04, 124.13; 365/106, 119, 151, 153

(56) References Cited

U.S. PATENT DOCUMENTS

| | | | |
|---|---|---|---|
| 3,896,420 A | 7/1975 | Szabo | |
| 4,101,976 A | 7/1978 | Castro et al. | |
| 4,459,682 A | 7/1984 | Mossberg | |
| 4,670,854 A | 6/1987 | Mossberg et al. | |
| 5,204,770 A | 4/1993 | Kachru et al. | |
| 5,276,637 A | 1/1994 | Mossberg | |
| 5,297,076 A | * 3/1994 | Jefferson et al. ............ | 365/119 |
| 5,369,665 A | 11/1994 | Bai et al. | |

OTHER PUBLICATIONS

Babbitt, W.R., et al., "Quasi–Two–Dimensional Time–Domain Color Memories: Process Limitations and Potentials," J. Opt. Soc. Am. B 11: 1948–1953 (1994).
Equall, R.W., et al., "Ultraslow Optical Dephasing in $Eu^{3+}$:$Y_2SiO_5$," Phys. Rev. Lett. 72:2179–2182 (1994).
Huang, J., et al., "Excess Dephasing in Photon–Echo Experiments Arising from Excitation–Induced Electronic Level Shifts," Phys. Rev. Lett. 63:78–81 (1989).
Lin, H., et al., "Demonstration of 8–Gbit/in.$^2$ Areal Storage Density Based on Swept–Carrier Frequency–Selective Optical Memory," Optics Letters 20:1658–1660 (1995).
MacFarlane, R.M., "Photon–Echo Measurements on the Trivalent Thulium Ion," Optics Letters 18:1958–1960 (1993).
Mossberg, T.W., "Time–Domain Frequency–Selective Optical Data Storage," Optics Letters 7:77–79 (1982).

(Continued)

*Primary Examiner*—Paul W. Huber
(74) *Attorney, Agent, or Firm*—Blakely, Sokoloff, Taylor & Zafman LLP

(57) ABSTRACT

An optical data storage system directs a reference beam and a data beam to a storage material having an inhomogeneous linewidth. The data beam is modulated to contain data to be stored in the storage material. The reference beam and the data beam illuminate storage cells of the storage material, causing data to be stored. The reference beam and the data beam spatially scan the cells and are frequency swept during their respective spatial scans. Data is retrieved from the cells by illuminating the storage material with the reference beam to produce a reconstructed data beam. In an embodiment, the reference beam and the data beam overlap and illuminate the storage cells simultaneously. The reconstructed data beam is detected as a heterodyne signal produced by mixing the reconstructed data beam and the reference beam in a detector.

2 Claims, 6 Drawing Sheets

OTHER PUBLICATIONS

Mossberg, T.W., "Swept–Carrier Time–Domain Optical Memory," Optics Letters 17:535–537 (1992).

Renn, A., et al., "Spectral Hole Burning And Hologram Storage," Applied Optics, vol. 26, No. 19 (Oct. 1, 1987), pp. 4040–4042.

Mitsunaga, M., et al., "Time– and Frequency–Domain Hybrid Optical Memory: 1.6–kbit Data Storage in $Eu^{3+}$: $Y_2SiO_5$," Optics Letters, vol. 16, No. 23, (Dec. 1, 1991), pp. 1890–1892.

Yano, R., et al., "Nonlinear Laser Spectroscopy of $Eu^{3+}$: $Y_2SiO_5$ And Its Application To Time–Domain Optical Memory," J. Opt. Soc. Am. B, vol. 9, No. 6, (Jun. 1992), pp. 992–997.

Lin, H., et al, "Heterodyne Detection of Swept–Carrier Frequency–Selective Optical Memory Signals," Optics Letters, vol. 20, No. 8, (Apr. 15, 1995), pp. 928–930.

* cited by examiner

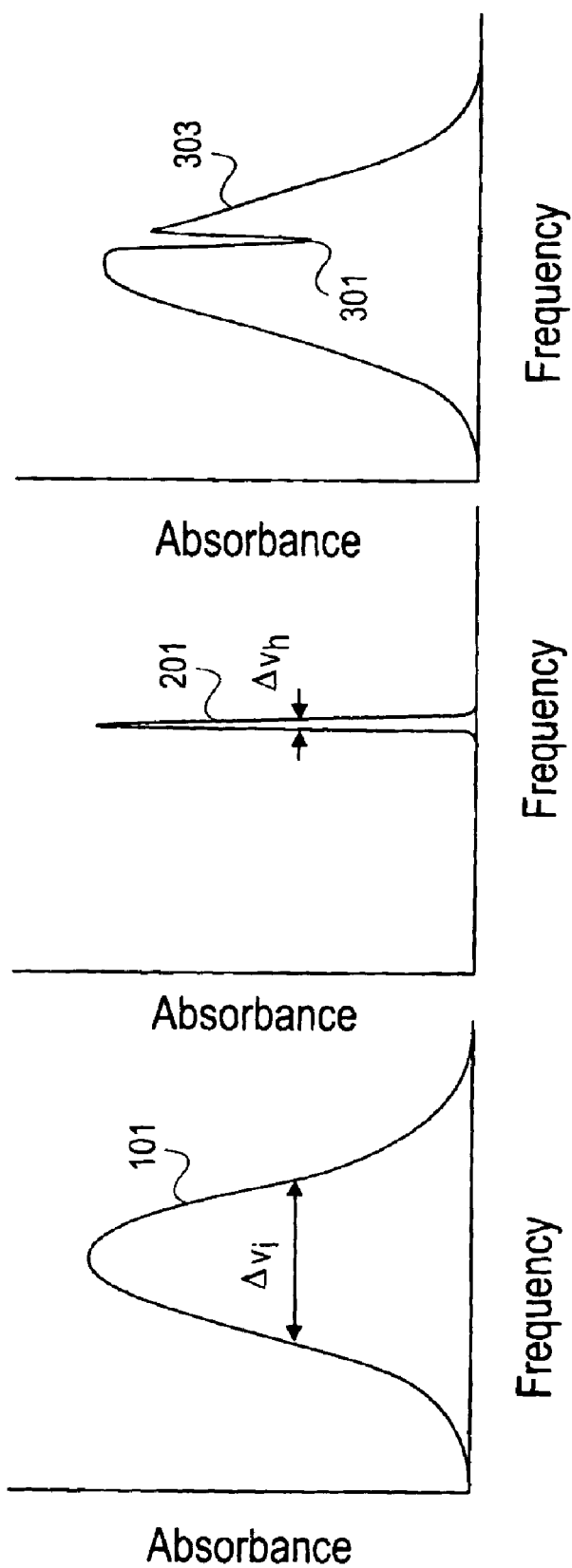

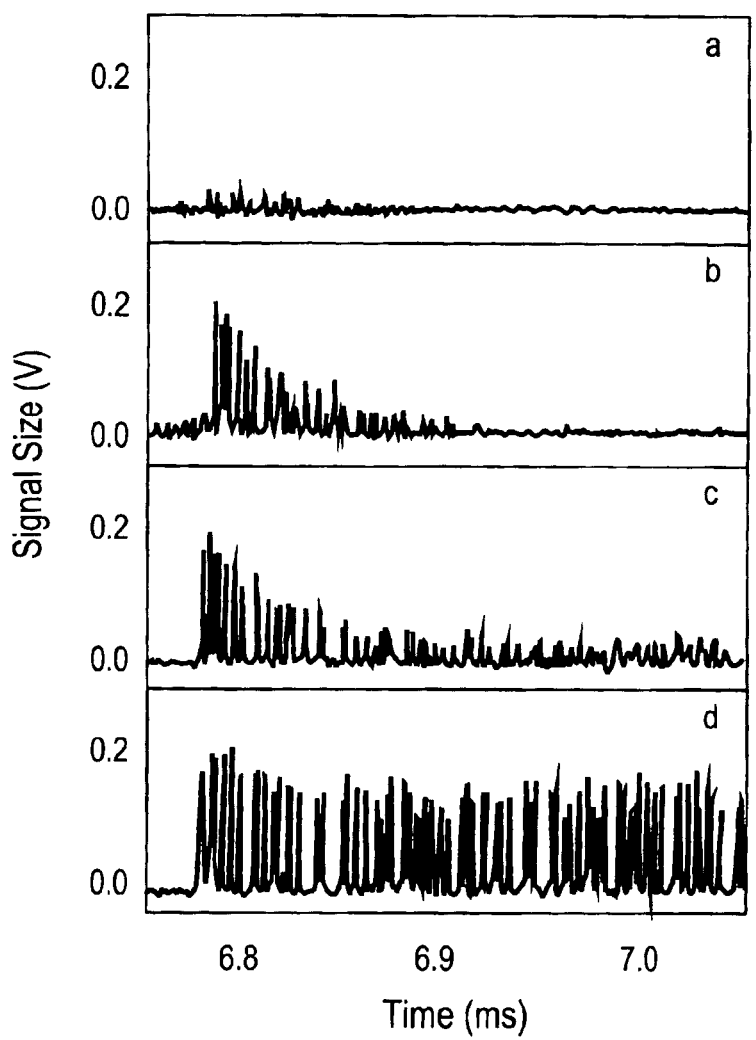

SPATIALLY-SPECTRALLY SWEPT OPTICAL MEMORIES AND ADDRESSING METHODS

This application is a divisional of, and claims priority from, U.S. patent application Ser. No. 09/412,841, filed Oct. 5, 1999, now U.S. Pat. No. 6,618,342, which claims benefit of Provisional Application Ser. No. 60/103,001, filed Oct. 5, 1998.

TECHNICAL FIELD

The invention pertains to methods and apparatus for optical data storage.

BACKGROUND

Optical data storage systems use changes in absorption, reflection, and/or refractive index of a storage material to store and retrieve data. In conventional optical data storage systems, individual spatial locations ("cells") on a substrate are allocated to store individual bits. A sequence of data bits is recorded in such memory systems by mapping each bit onto a different storage cell, and changing a material parameter at each cell to represent the data bit. Readout of the memory is accomplished by illuminating each cell with a light source. In conventional implementations of such memories (CD-ROM, magneto-optic disks, etc.), each cell records one data bit.

Rather than directly allocating each cell to an individual data bit, frequency-selective data storage ("FSDS") memories have been demonstrated in which multiple data bits are recorded in each storage cell. Volatile frequency-selective memories are disclosed in, for example, U.S. Pat. No. 3,896,420, and non-volatile memories are disclosed in, for example, U.S. Pat. No. 4,101,976. FSDS memories record multiple bits in each cell using materials that allow spectral addressing of individual atoms or molecules. FSDS memories thus use both spectral and spatial addressing to access different portions of the storage material's absorption spectrum as well as different locations in the storage material.

FSDS systems use storage materials that have inhomogeneously broadened absorption profiles such as the absorption profile 101 of FIG. 1. An absorption profile of an inhomogeneously broadened material (such as the absorption profile 101) is characterized by an inhomogeneous linewidth $\Delta v_i$ that is a measure of the spectral width of the absorption profile (typically the full width of the absorption profile at one-half of the maximum value of absorbance). The absorption profile results from a summation of absorption profiles from individual absorbers (atoms, molecules or other active absorber centers), each having a spectral absorption profile and a spectral width referred to as a homogeneous absorption profile and a homogeneous linewidth $\Delta v_h$, respectively. FIG. 2 shows an example of a homogeneous absorption profile 201 of an individual absorber. Inhomogeneous broadening arises from the differing microenvironments for individual absorbers shifting the optical frequencies at which absorption occurs. Thus, the inhomogeneous absorption profile represents a combination of narrower, homogeneous absorption profiles centered at different frequencies. FSDS systems use materials in which the inhomogeneous linewidth is larger than the homogeneous linewidth.

When an inhomogeneously broadened material is illuminated with a single frequency light source, only the absorbers resonant with this single frequency interact with the light, resulting in optical excitation of these absorbers. Illuminating such a material with light having a bandwidth less than the material's inhomogeneous absorption linewidth produces a dip, or "spectral hole" in the absorption profile. The minimum width of a spectral hole is approximately equal to the homogeneous absorption linewidth. FIG. 3 illustrates a spectral hole 301 of width $\Delta v_h$ in an inhomogeneous absorption profile 303. FSDS systems use multiple spectral holes to record multiple bits in a single cell. The number of spectral storage channels available in a single cell of an inhomogeneously broadened material is determined by the ratio $\Delta v_i/\Delta v_h$ of the inhomogeneous linewidth $\Delta v_i$ to the homogeneous linewidth $\Delta v_h$. The number of spectral channels used is referred to as "spectral multiplicity." For additional discussion of spectral hole-burning, see, for example, W. E. Moerner, ed, Persistent *Spectral Hole Burning: Science and Applications* (Springer Verlag, New York, 1988).

Two types of FSDS systems have been demonstrated and both can achieve the same spectral multiplicity. The first type is referred to as "frequency-domain" FSDS, and the second class is referred to as "time-domain FSDS." These two types are discussed briefly below. In addition to these two types of FSDS systems, a "swept-carrier" system is disclosed in Mossberg, U.S. Pat. No. 5,276,637, incorporated herein by reference.

Frequency-domain FSDS systems directly address individual spectral channels in an inhomogeneously broadened material. In such systems, a narrowband light source having a spectral width less than the inhomogeneous linewidth $\Delta v_i$ illuminates a storage material. A continuous wave ("CW") laser is typically used as the narrow-band source. Absorbers for which the narrow-band light source fulfills the resonant condition are excited, recording data. Photo-induced absorption or refractive index changes produced by this excitation are probed to retrieve recorded data. If the linewidth $\Delta v_l$ of the narrow-band light source is less than the homogeneous linewidth $\Delta v_h$, the achievable storage capacity in each cell is $\Delta v_i/\Delta v_h$. If the source linewidth $\Delta v_l$ is larger than the homogeneous linewidth $\Delta v_h$, then the storage capacity is instead $\Delta v_i/\Delta v_l$ and is said to be "laser linewidth limited."

Frequency-domain FSDS imposes data-rate limitations on single bit recording. A spectral channel width $\Delta v_{ch}$ must be addressed with illumination having a pulse duration greater than $1/\Delta v_{ch}$ because of a Fourier-transform relationship between pulse duration and linewidth. Thus, to access the kHz-scale linewidths available in some rare-earth-doped crystals, recording and readout pulses of approximately millisecond durations are required. The spectral holes produced in such FSDS systems can be either transient or permanent, as disclosed in U.S. Pat. No. 3,896,420, incorporated herein by reference.

Rather than allocating individual frequency channels to individual bits, time-domain FSDS systems use pulses with spectral widths larger than the homogeneous linewidth $\Delta v_h$ and therefore can use pulses with durations less than $1/\Delta v_h$. Time-domain FSDS systems can record data streams containing pulses that are as short as $1/\Delta v_i$. In time-domain FSDS systems, a storage material is exposed to a brief reference pulse and a data pulse corresponding to a data-bit stream. These pulses illuminate the storage material sequentially to record an interference between the frequency spectra of the reference pulse and the data pulse, resulting in the direct recording of the spectrum of the data-bit stream. If the reference pulse precedes the data pulse, subsequent illumination of the storage material with a replica of the reference pulse produces a reconstruction of the data pulse. Such time-domain FSDS systems are described in, for example, U.S. Pat. No. 4,459,682, incorporated herein by reference.

Time-domain FSDS systems use temporally distinct reference pulses to record the spectrum of a data-bit stream, while swept-carrier FSDS systems record the spectrum of a data-bit stream using frequency-swept (chirped) reference and data beams. The reference and data beams simultaneously illuminate the storage material, and subsequent illumination with the frequency swept reference beam reproduces the data beam. Such systems are disclosed in, for example, Mossberg, U.S. Pat. No. 5,276,637 and Mossberg et al., Opt. Lett. 17, 535 (1992).

In conventional FSDS systems, a positioning system directs a laser beam to a particular cell, and data is recorded in, or read from, the entire spectral capacity at the cell. Thus, the laser is stationary in two spatial dimensions while the data is stored or retrieved using a third dimension (frequency).

An important limitation of both time-domain and swept-carrier data storage is excitation-induced frequency shifts, also referred to as excitation-induced dephasing or instantaneous dephasing, as described in, for example, Huang et al., Phys. Rev. Lett. 63, 78 (1989). The excitation-induced frequency shifts increase the homogeneous linewidth $\Delta v_h$ with increasing levels of illumination. Thus, as data is recorded, the data storage capacity of the material decreases. The storage capacity can be dramatically lower than the intrinsic storage capacity. For example, in $Eu^{3+}$-doped $Y_2SiO_5$, the intrinsic data storage capacity based on the ratio of the inhomogeneous and homogeneous linewidths is greater than $10^6$ bits/cell. See, for example, R. Equall et al, Phys. Rev. Lett. 72, 2179 (1994), Yano et al, J. Opt. Soc. Am. B 9, 992 (1992). The storage capacity of $Eu^{3+}$-$Y_2SiO_5$: drops to approximately 2000 bits/cell whenever the inhomogeneous absorption profile of the storage material is fully excited. Thus, while conventional time-domain data-access methods provide fast data access, excitation-induced frequency shifts severely limit data-storage capacity.

SUMMARY OF THE INVENTION

Methods of storing data in cells of a storage material having an inhomogeneous absorption with an inhomogeneous linewidth $\Delta v_i$, are provided. The methods include directing a reference pulse of electromagnetic radiation and a data pulse of electromagnetic radiation to the storage material. The data pulse is modulated according to data to be stored in the cells of the storage material. The reference pulse and the data pulse are spatially-spectrally swept, causing data to be stored in the cells of the storage material. In some embodiments, the reference spatial-spectral trajectory and the data spatial-spectral trajectory are the same while in other embodiments, the reference and data spatial-spectral trajectories are offset in position or frequency. In a representative embodiment, the reference pulse and the data pulse simultaneously illuminate each individual storage cell of the storage material and co-propagate to and through the storage material.

In a specific embodiment, a frequency sweep of at least one of the reference and data spatial-spectral trajectories is a linear sweep.

In other methods, a data bit is stored using a channel bandwidth $\Delta v_{ch}$ and at least one of the spatial-spectral trajectories spans a frequency rang that is larger than the channel bandwidth $\Delta v_{ch}$.

Methods of storing a first data record and a second data record, the data records including one or more data bits, include providing a storage material having an inhomogeneously broadened absorption of linewidth ($\Delta v_i$) that is greater than the channel bandwidth ($\Delta v_{ch}$) used to store a single data bit. A first reference pulse is provided that has a first starting frequency within the inhomogeneous linewidth ($\Delta v_i$), a first starting spatial position on the storage material, and follows a first spatial-spectral trajectory that spans a first spectral width greater than the channel bandwidth $\Delta v_{ch}$. The channel bandwidth is less than or equal to the inhomogeneous linewidth $\Delta v_i$. A first data pulse is also provided to the storage material. The first data pulse has a second starting frequency within the inhomogeneous linewidth ($\Delta v_i$) and a second starting spatial position on the storage material. The first data pulse follows a second spatial-spectral trajectory that spans a second spectral width that is greater than the channel bandwidth ($\Delta v_{ch}$) and that is less than or equal to the inhomogeneous linewidth ($\Delta v_i$). The first data pulse has a modulation corresponding to a first data record. The first data record is stored in the storage material by exposing the storage material to the first data pulse and the first reference pulse. A second reference pulse and a second data pulse are provided, the second reference pulse and the second data pulse following a third spatial-spectral trajectory and a fourth spatial-spectral trajectory. These trajectories span spectral widths that are greater than the channel bandwidth ($\Delta v_{ch}$) and less than or equal to the inhomogeneous linewidth ($\Delta v_i$). Preferentially, the third spatial-spectral trajectory does not overlap the first spatial-spectral trajectory but does overlap the fourth spectral-spatial trajectory. The second data pulse has a modulation corresponding to a second data record and the second data record is stored in the storage material by exposing the storage material to the second reference pulse and the second data pulse.

In alternative embodiments, the storage material comprises multiple cells for storing portions of the first and second data sequences and the multiple cells are exposed to the first reference pulse and the first data pulse simultaneously. In additional specific embodiments the storage material is $Eu^{3+}$:$YSiO_5$.

Apparatus for storing and retrieving data from a storage material having an inhomogeneous absorption are provided. The apparatus comprise a laser that produces a laser beam having a frequency that sweeps through a frequency range, a signal generator that generates a reference signal, and a data source that provides a data signal. A modulator such as an acousto-optic modulator, electro-optic modulator or other type of modulator receives the reference signal, the data signal, and the laser beam and generates a reference beam and a data beam. The data beam is modulated by the data signal, and the data beam and the reference beam are co-propagating. A scanner scans the data beam and the reference beam across the storage material, so as to cause data to be stored in cells of the storage material. A detector is provided that receives the reference beam transmitted by a cell and a reconstructed data beam produced by the transmission of the reference beam through the cell. The detector producing a heterodyne signal from the reference and reconstructed data beams, wherein the heterodyne signal has a modulation corresponding to data retrieved from the storage material.

These and other features of the invention are set out below with reference to the accompanying drawings.

BRIEF DESCRIPTION OF THE DRAWINGS

FIG. 1 illustrates an inhomogeneous absorption profile of a frequency-selective material having an inhomogeneous linewidth $\Delta v_i$.

FIG. 2 illustrates a homogeneous absorption profile of a single representative absorber of a frequency-selective material, the absorption profile having a homogeneous linewidth $\Delta v_h$.

FIG. 3 illustrates a spectral hole burned in the inhomogeneous absorption profile of FIG. 1.

FIGS. 8A–8D illustrate data retrieved using the system of FIG. 6 at different swept rates.

DETAILED DESCRIPTION

Figure 4:
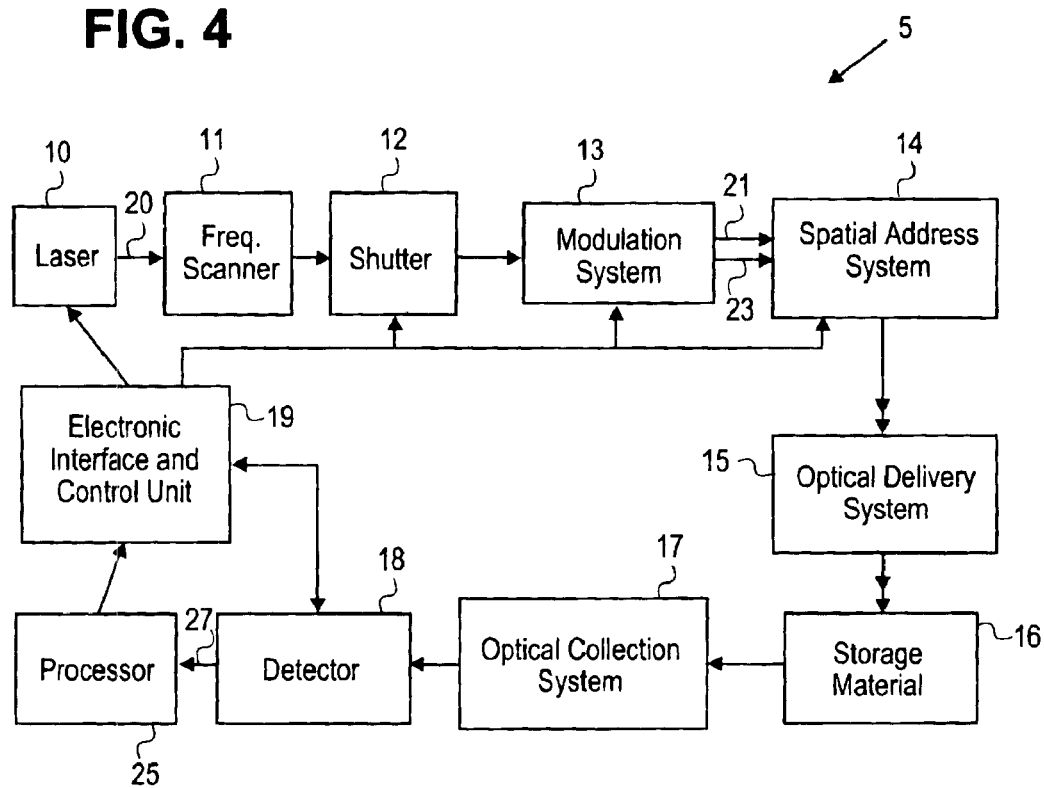
FIG. 4 is a block diagram of a swept spatial-spectral memory system.

The following terms are used herein:

Co-propagating: Beams that propagate in a common direction and that spatially overlap are co-propagating beams.

Data wave: Electromagnetic radiation used to record data or a data sequence, and having a modulation corresponding to the data or data sequence. Also referred to as a "data beam" or a "data pulse." As used herein, electromagnetic radiation or optical radiation refers to electromagnetic radiation at a frequency matched to the inhomogeneous absorption profile of a selected storage material.

FSDS: "Frequency-selective data storage," i.e., recording data in a frequency-selective material using spectral multiplexing by storing different data in different portions of an inhomogeneous absorption profile. FSDS includes frequency-domain, time-domain, and swept-carrier data storage.

Direct-detection swept-carrier data storage: Swept-carrier FSDS in which the reference and data waves are not co-propagating. The reference and data waves spatially overlap at the storage material (but generally not at other positions) producing a reconstructed data wave that is a replica of the data wave.

Spatial-spectral Sweep: A variation of frequency and position of a wave. A spatial-spectral sweep defines an area in space-frequency coordinates referred to as a "trajectory."

$f_m$: A frequency range spanned by a spatial-spectral sweep.

Heterodyne swept-carrier data storage: Swept-carrier FSDS in which the reference and data waves are co-propagating and the data is recovered as a heterodyne beat frequency between the transmitted reference wave and the reconstructed data wave.

Homogeneous linewidth, $\Delta v_h$: The linewidth of a single absorption center.

Inhomogeneous linewidth a $\Delta v_i$: The collective linewidth of a multiple absorbers in a unit of storage material having a distribution of center (resonance) frequencies.

Intrinsic capacity: The maximum storage capacity of an FSDS material, generally expressed by the ratio $\Delta v_i / \Delta v_h$ and neglecting excitation-dependent line broadening.

Reference wave: One of two waves used to record a data sequence. During recording, the reference wave is used to prepare the storage material. After data is recorded, illumination with the reference wave produces a reconstructed data wave that corresponds to the data wave.

Spotlet: A region at the storage material illuminated by a data wave or other wave at any one instant. A spotlet is also referred to as a "beam diameter" and corresponds to a beam waist or beam spot size.

Superspot: A region of the storage material illuminated by spatially sweeping the recording waves (the data wave and the reference wave) or the wave used to reconstruct data (the reference wave). A superspot is a set of spotlets.

$T_{sweep}$: A time required to store or retrieve data in a spatial-spectral sweep of a superspot.

$\tau_b$: The duration of a single bit in a data sequence.

$X_m$: A spatial range spanned in a spatial-spectral sweep. In some examples, $X_m$ is a spatial extent of a superspot.

$X_{sp}$: A spatial diameter of a spotlet.

$\Delta v_{ch}$: Channel bandwidth. The spectral width of an inhomogeneous absorption line allocated to the storage of a single bit.

Methods are provided for simultaneous spectral and spatial access to a frequency-selective optical storage material. These methods improve the performance of FSDS systems, by, for example, reducing the effects of excitation-induced frequency shifts. In the storage methods and systems disclosed herein, an optical reference beam (or pulse) and an optical data beam (or pulse) are simultaneously swept across a storage material while the respective beam frequencies are changed.

Absorbers in the storage material can be described with reference to a position-frequency coordinate system having coordinate axes that represent the spatial coordinates of each absorber and a spectral coordinate that represents each absorbers' position within an inhomogeneous absorption profile. In a representative embodiment, data is stored and retrieved using laser beams that follow predetermined trajectories in position-frequency space. During a particular read or write operation, different portions of the available inhomogeneous absorption profile are typically accessed at different spatial locations of the storage material. Since excitation at one spatial location does not contribute strongly to excitation-induced frequency shifts at adjacent spatial locations, the net effect of excitation-induced frequency shifts is reduced. The entire position-frequency space volume of the storage material can be used for data storage with multiple storage and retrieval operations.

Such systems use simultaneous spatial and spectral scanning during the data-recording and data-retrieval processes. Spatial-spectral scanning produces a path or trajectory in position-frequency space, referred to herein as a "spatial-spectral trajectory." The spatial-spectral trajectories can be individually varied to optimize performance for various storage material properties and to reduce excitation-induced line broadening.

FIG. 4 illustrates a spatial-spectral sweep apparatus 5. The apparatus 5 includes a narrow-band, continuous wave, tunable laser 10 that produces a laser beam 20 at a wavelength suitable for the excitation of a storage material 16 having an inhomogeneous absorption profile. A frequency scanner 11 tunes the laser 10, sweeping the wavelength of the laser beam 20 across the inhomogeneous absorption profile of the storage material 16. A shutter 12 blocks the laser beam 20 whenever data is being neither recorded in nor retrieved from the storage material 16.

A modulation system 13 transmits the laser beam 20 and produces a reference beam 21 and data beam 23. Data to be recorded in the storage material 16 are modulated onto the data beam 23. The reference beam 21 and the data beam are received by a spatial address system 14 that is situated to angularly deflect the reference beam 21 and the data beam 23. An optical delivery system 15 converts the angular deflections produced by the spatial address system 14 into corresponding spatial displacements of the reference beam 21 and the data beam 23, and directs the spatially displaced beams to the storage material 16. After transmission through the storage material 16, an optical collection system 17 directs the transmitted data and reference beams to an optical detector 18 that is used for data retrieval. A detector signal 27 from the optical detector 18 is delivered to a processing system 25 that produces a signal corresponding to the retrieved data. The processing system is in communication with a control system 19 that controls the frequency scanner 11, the shutter 12, the modulator system 13, the spatial address system 14, and the optical detector 18. The detector 18 is generally active only during data retrieval and is unnecessary during data storage.

In an example of data storage, the frequency range used by each data bit to be stored is approximately $\tau_b^{-1}$, where $\tau_b$ is a duration of the data bit. To store a spectral interference between the reference beam and the data beam, the laser beam 20 preferably has a coherence time longer than about $T_{sweep}/(f_m \tau_b)$ or $1/\tau_b$, whichever is longer, wherein $T_{sweep}$ is a time duration used to sweep the frequency of the reference beam 21 or the data beam 23 over a frequency range $f_m$. The frequency scanner 11 controls the frequency of the laser 10, thereby tuning the laser 10 over a frequency range $f_m$ in a time duration $T_{sweep}$. To fully use the spectral bandwidth of the storage material 16, the frequency range $f_m$ is greater than or equal to the inhomogeneous linewidth $\Delta v_i$. The time duration $T_{sweep}$ is selected to provide a selected combination of bit rate and storage capacity, wherein $T_{sweep} = \tau_b N_b$ and $N_b$ is a number of bits.

In FIG. 4, the shutter 12 is shown as a separate component, but the shutter 12 can be included in the modulation system 13.

The modulation system 13 produces both the data beam 23 (a data wave) that is modulated by a data signal and the reference beam 21. The reference beam 21 and the data beam 23 can be offset in frequency relative to each other and can be either co-propagating or spatially separate. In an example, the frequency offset between the reference wave and the data wave is $(2\tau_b)^{-1}$. In the system 5 of FIG. 4, the data beam 23 and the reference beam 21 use a common frequency sweep applied to the laser 10, but the beams can be individually swept over different respective frequency ranges.

The spatial addressing system 14 directs the reference and data beams from the modulation system 13 into varying spatial directions. The number of distinguishable spatial directions (angles or beam diameters) obtainable using the spatial address system 14 determines a corresponding number of independently addressable spots in the storage material 16. The number of distinguishable spatial directions depends upon the range of deflection angles produced by the spatial address system 14 and the diffraction angle of the laser beam 20.

The optical delivery system 15 directs the reference and data beams to the storage material 16 and focuses the reference and data beams on the storage material 16. The optical delivery system 15 overlaps the common frequency components of the two waves at the storage material 16. The size of each of the focused spots is selected to maximize an output-signal magnitude obtainable during data retrieval and to fully use all of the available cells of the storage material 16. The beam spot size at the storage material 16 is referred to herein as a "spotlet size" ($t_{sp}$).

The storage material 16 is selected to have properties suited to a given application, based on material properties such as intrinsic capacity (a ratio of $\Delta v_i/\Delta v_h$) and data storage time. An example material is $Eu^{3+}$-doped $Y_2SiO_5$, having an intrinsic capacity of greater than $10^6$ bits/cell, and a data storage time of hours. This material is appropriate for high-density, dynamic optical memories and is described in, for example, R. Equall et al., *Phys. Rev. Lett.* 72, 2179 (1994) and Yano et al., *J. Opt. Soc. Am. B* 9, 992 (1992), both of which are incorporated herein by reference. Another suitable storage material is any of a various $Tm^{3+}$-doped inorganic crystals that provide storage materials having intrinsic capacities of $10^6$ bits/spot and storage times of up to 10 ms. Consequently, such $Tm^{3+}$-doped materials are appropriate for use in buffer memories. These materials are discussed in, for example, Macfarlane, *Opt. Lett.* 18, 829 (1993).

The optical collection system 17 collects a "reconstructed data beam" from the storage material 16 and directs the reconstructed data beam as well as a reference beam onto the detector 18. In order to recover the stored data, the detector has a bandwidth greater than $\tau_b^{-1}$. In addition, the detector desirably has a sensitivity sufficient for the detection of the reconstructed data beam.

Figure 5:
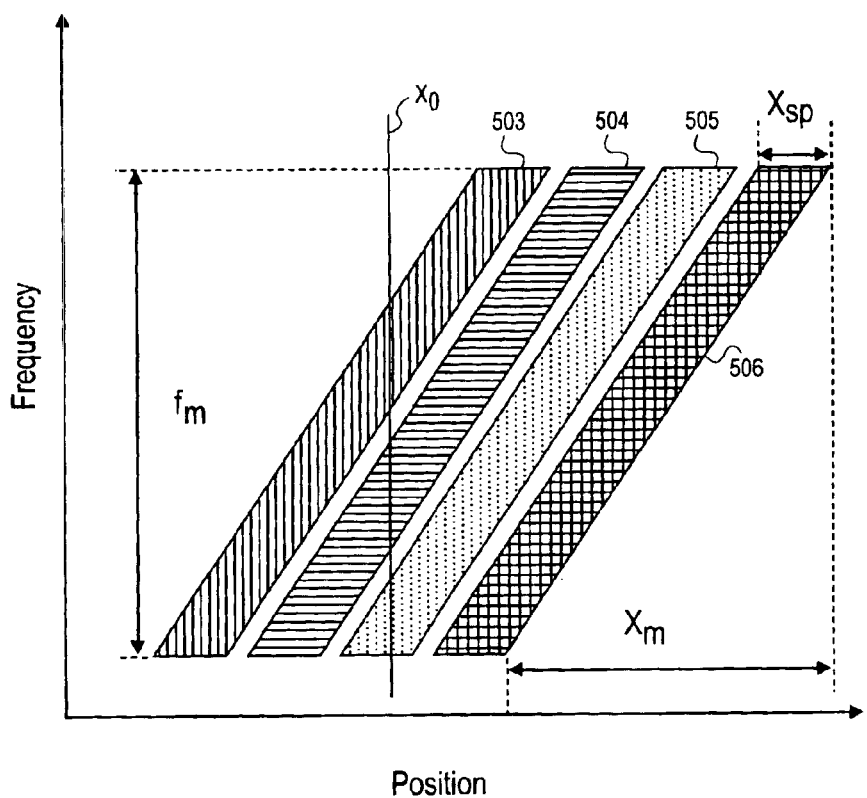
FIG. 5 illustrates four spatial-spectral trajectories swept by the system of FIG. 4.

The spatial-spectral sweep apparatus 5 of FIG. 4 operates as follows. To store a set of data within a single superspot, the laser 10 is tuned by the frequency scanner 11 to a first frequency, the spatial address system 14 selects a first spatial location (cell) on the storage material 16 for storing the data, and the shutter 12 opens to allow the reference beam 21 and the data beam 23 to pass through. During data storage, a linear or nonlinear ramp is applied to the frequency scanner 11 and to the spatial address system 14, generating spatial and spectral trajectories (sweeps). As the frequency of the laser 10 is scanned, data is modulated onto the data beam by the modulation system 13. Several representative spatial-spectral trajectories 503, 504, 505, 506 are shown in FIG. 5. Starting points of adjacent trajectories are displaced in space or frequency in the figure. The output frequency of the laser 10 is swept over the frequency range $f_m$ and a spatial range $X_m$, and the respective time-dependent spectra of the beams are stored in the storage material 16. Referring to FIG. 5, in a first frequency sweep, data is stored along the trajectory 503. After the sw ep of the trajectory 503 is complete, a second sweep, beginning at the frequency $f_o$, stores data along the trajectory 504. Data is stored along trajectories 505, 506 in additional sweeps that are similarly displaced. During quiescent periods between trajectories and following the storage of the last trajectory, the shutter 12 is closed.

The spatial-spectral sweep apparatus 5 spatially spreads a data-bit sequence across positions and frequencies specified by the sweep trajectories. Although FIG. 5 shows linear trajectories, non-linear spatial and spectral trajectories can be used. In addition, the spatial and spectral sweeps need not be linear functions of time.

To retrieve a stored data sequence, the frequency and position of the laser 10 are reset to initial values. The shutter 12 is opened and the spatial-spectral sweep used for data storage is repeated using only the reference beam 21. During data retrieval, the reference beam 21 interacts with the storage material 16 and produces a reconstructed data beam corresponding to the original data beam 23. The reconstructed data beam is collected by the collection system 17, directed to the detector 18, and converted back into an electronic data sequence, corresponding to the stored data sequence, by the processing system 25.

The apparatus 5 of FIG. 4 increases the storage capacity of swept-carrier FSDS systems by illuminating only a small portion of the inhomogeneous absorption profile in a spatial cell at any one instant. Some storage materials include absorbers that can be considered as three-level systems having a ground state, an excited state, and a trap state. Excitation by an absorber causes a transition from the ground state to the excited state. The excited state decays to the trap state, and the trap state eventually decays to the ground state, typically with a time constant in the range of a tens of milliseconds to hours. The excited state decays much more rapidly to the trap state with a time constant referred to as an "excitation lifetime." To avoid excitation-induced storage-capacity reductions, a spatial cell should be illuminated only a few times (preferably only once) during a time interval equal to or approximately equal to the excitation lifetime. After an absorber has relaxed to the trap state, the absorber no longer contributes significantly to excitation-induced line broadening. In addition, the data beam and the reference beam need not be applied simultaneously but within a dephasing time $T_2$ that is corresponds to a duration required for the phase of the excited state to be randomized.

To fully use the inhomogeneous absorption profile, the recorded superspots desirably partially overlap spatially. For example, the spatial-spectral trajectories 503–505 of FIG. 5 partially overlap each other at a position at which $X=X_o$, but there is no spectral overlap at such locations. Although the spatial sweep is generally two-dimensional, for convenience the trajectories 503–506 show one-dimensional sweeps.

As shown in FIG. 5, the spatial-spectral trajectories 503–506 are linear. As the laser 10 is swept along a spatial-spectral trajectory, each cell receives an excitation over specific spectral bandwidths from the reference and data beams. For accurate data retrieval, the excitation bandwidths experienced by a cell from the reference beam and th data beam are approximately equal. If $\tau_b^{-1} > f_m \tau_b / T_{sweep}$, then the number of spotlets N in each superspot preferably satisfies the condition $N < f_m \tau_b$. Since excitation-induced broadening of $\Delta \nu_h$ produced by increasing illumination of the storage material 16 is approximately linear with the magnitude of the received excitation, and because the capacity of a frequency-selective storage material is inversely proportional to $\Delta \nu_h$, the storage capacity of an FSDS system can be increased by a factor of about N using a spatial-spectral sweep according to the invention.

Figure 6:
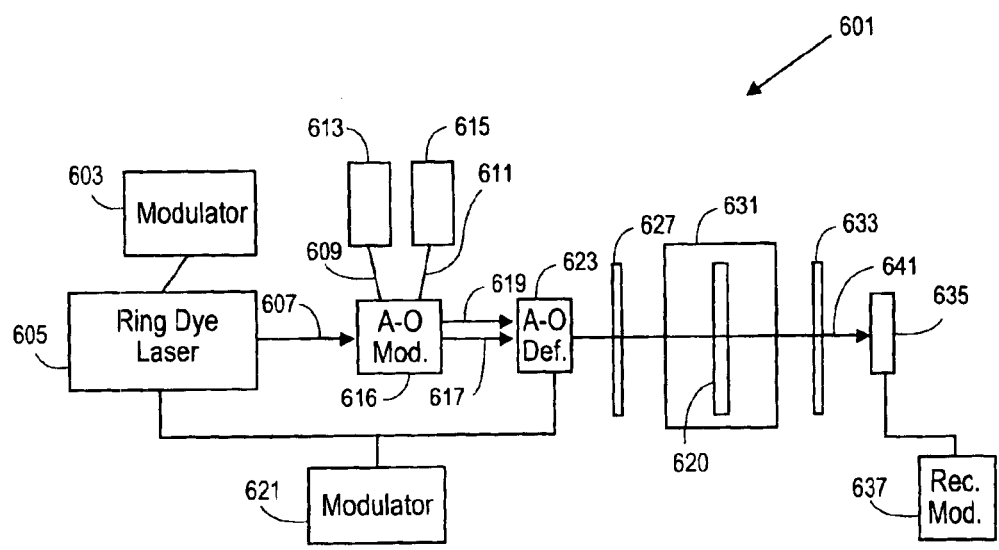
FIG. 6 illustrates a specific embodiment of a system for optical data storage and retrieval.

FIG. 6 shows a specific example of a spatial-spectral sweep apparatus 601 using collinearly propagating data and reference beams. A modulator 603 sinusoidally modulates a ring dye laser 605, producing a laser beam 607 that sweeps repetitively over a 1 GHz frequency range with a 6.25 ms period. During data storage, a reference signal 609 and a data signal 611, supplied by a reference generator 613 and a data source 615, respectively, are applied to an acousto-optic modulator 616 to produce a reference beam 617 and a data beam 619, respectively. The reference beam 617 and the data beam 619 have a frequency offset of 4 MHz, and the data beam 619 is amplitude-modulated with binary data to be stored in a storage material 620. With this frequency offset, the reference beam 617 and the data beam 619 are collinear within a diffraction limit of the beams 617, 619. During data retrieval, a read signal is applied to the acousto-optic modulator 616 to generate a reconstructed data beam 641.

A modulator 621 drives an acousto-optic deflector 623 synchronously with the laser frequency sweep and deflects the co-propagating reference beam 617 and data beam 619. A lens 627 receives the both beams and focuses the beams to a selected storage location in the storage material 620. In this embodiment, the storage material 620 is a 10 mm by 11 mm by 2 mm $Eu^{3+}:Y_2SiO_5$ crystal that is maintained at a temperature of about 5 K in a flowing helium cryostat 631. The combined beams propagate along a baxis (the 2 mm direction) of the $Eu^{3+}:Y_2SiO_5$ crystal and are polarized along a $D_1$-axis. Peak powers in the data, reference, and reconstructed data beams are all about 300 $\mu$W and the spot size of each of the beams is about 40 $\mu$m.

Data stored in the storage material 620 is retrieved by directing a reference beam to the storage material 620 to generate the reconstructed data beam 641 corresponding to the data beam 619. The reconstructed data beam 641 and the reference beam are then focused by a lens 633 onto a detector 635 to produce a heterodyne beat signal at a data-reference beam offset frequency of 4 MHz. This heterodyne signal is electronically processed by a receiver module 637 to produce an electrical signal that corresponds to the stored data. In this example, the reference beam serves as a local oscillator for the reconstructed data wave.

FIG. 6 illustrates a spatial-spectral sweep apparatus 601 that produces a heterodyne signal during data retrieval, i.e., carrier frequencies of the reference beam and the reconstructed data beam are not equal). Similar apparatus are possible that mix an external local oscillator (instead of a portion of the reference signal) with a reconstructed data beam to produce a homodyne signal. Alternatively, a portion of the unmodulated data beam can be transmitted to serve as a local oscillator.

Figure 7:
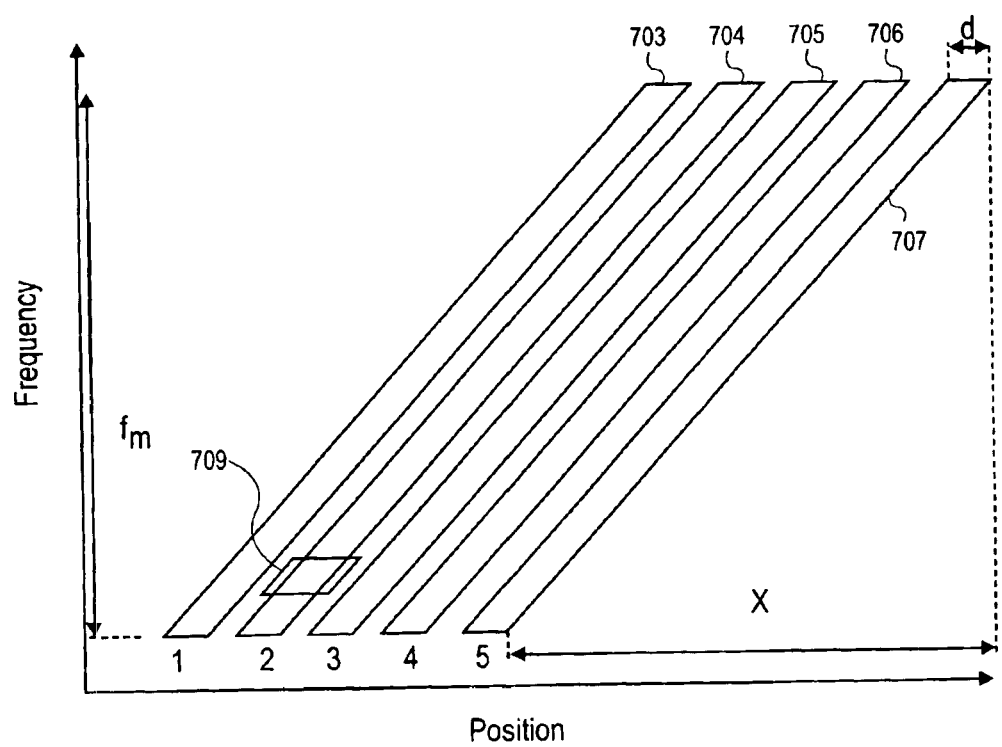
FIG. 7 illustrates four representative spatial-spectral trajectories obtained with the system of FIG. 6.

FIG. 7 illustrates spatial-spectral trajectories 703–707 swept by the system 601 of FIG. 6. Each of the trajectories 703–707 includes a respective spectral sweep over a frequency range $f_m$ and a spatial sweep over a spatial range X having a spotlet size d. Because the period of the frequency scan produced by the acousto-optic modulator 616 is 6.25 ms, scanning the five trajectories 703–707 requires a minimum of 31.25 ms. In other embodiments, the time interval can be longer or shorter.

FIGS. 8A–8D show examples of stored data retrieved during a 300 $\mu$s time interval during data retrieval. The data correspond to data stored in a trajectory area 709 shown in FIG. 7, but the retrieved data of FIGS. 8A–8D were obtained without storing data along the trajectories 703, 705–707.

In FIGS. 8A–8D, the respective retrieved data bits are shown as respective magnitudes (on an arbitrary scale) as a function of time at which each bit is retrieved. FIGS. 8A–8D represent data retrieval with respective spatial scan ranges (X-values) of 0 $\mu$m, 36 $\mu$m, 160 $\mu$m, and 440 $\mu$m, corresponding to average sweep rates of 0 $\mu$m/ms, 120 $\mu$m/ms, 530 $\mu$m/ms, and 1550 $\mu$m/ms, respectively. FIG. 8A shows that with no sweep, only a few data bits are retrieved and that these data bits are retrieved with small magnitudes. FIGS. 8B–8D demonstrate that more extensive spatial sweeps permit better retrieval of larger numbers of data bits. Sweep rates are generally selected to that any spatial cell receives approximately the same spectral bandwidth from both the data beam and the reference beam, i.e., the sweep rate is selected so that a product of a frequency sweep rate $R_{sweep}$ and an exposure time $\Delta t_b$ is approximately equal to a bit bandwidth $\Delta \tau_b$. The sweep rate is also selected based on illumination intensity to achieve a selected product of illumination intensity and exposure time.

The embodiment described above is illustrative, and the scope of the invention is not to be constrained by the specific details presented therein. The invention rather should be understood to include a general class of devices that use the methods described and of which the above embodiments are particular examples. The particular values chosen for parameters such as reference beam/data beam frequency offset, number of spotlets, etc, correspond to a particular choice of values for a particular implementation, and the invention is not restricted to the disclosed values.

Although a tunable laser is used in the embodiments discussed above a narrow-band, fixed-frequency laser can alternatively be used, wherein the frequency sweep produced external to the laser, using, for example, an acousto-optic or electro-optic modulator.

In the embodiment of FIG. 4, the spatial address system 14 is used to address spatial locations on the storage material 16. Alternatively, the storage material 16 can be moved physically to produce a spatial-spectral sweep. Such spatial-spectral addressing would be particularly well suited to a disk-based optical memory.

The system 5 of FIG. 4 uses data and reference beams that propagate and are deflected together. In alternative systems, the data and reference beams overlap only at the storage material. As such alternative systems are constrained by excitation-induced frequency shifts in the same manner as the system of FIG. 4, the spatial-spectral sweep method disclosed herein is also of benefit to systems that do not use co-propagating beams.

The wavelengths or the reference beam and the data beam can be selected based on the inhomogeneous absorption profile of the storage material and includes visible light as well as other wavelengths that are resonant with at particular inhomogeneous absorption profile.

The invention is directed to novel and non-obvious aspects of this disclosure, both individually and in combination as set forth in the claims below. While the invention is described with respect to particular implementations, the invention is not limited to these implementations.

We claim:

1. An apparatus for storing and retrieving data from a storage material having an inhomogeneous absorption, comprising:

a laser that produces a laser beam having a frequency that sweeps through a frequency range;

a signal generator that generates a reference signal;

a data source that provides a data signal;

an acousto-optic modulator that receives the reference signal, the data signal, and the laser beam and generates a reference beam and a data beam, the data beam modulated by the data signal, wherein the data beam and the reference beam are co-propagating;

a scanner that scans the data beam and the reference beam across the storage material, so as to cause data to be stored in cells of the storage material; and a detector situated to recieve the reference beam transmitted by a cell and a reconstructed data beam produced by tranmission of the reference beam through the cell, the detector producing a heterodyne signal from the reference and reconstructed data beams, wherein the heterodyne signal has a modulation corresponding to data retrieved from the storage material.

2. The apparatus of claim 1, wherein the storage material is $Eu^{3+}$:$YSiO_5$.

* * * * *